United States Patent
Stiglmaier (10) Patent No.: US 10,876,603 B2
(45) Date of Patent: Dec. 29, 2020

(54) CHAIN DRIVE WITH A COMBINATION RAIL

(71) Applicant: IWIS MOTORSYSTEME GMBH & CO. KG, Munich (DE)

(72) Inventor: Franz Stiglmaier, Munich (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 466 days.

(21) Appl. No.: 15/751,446

(22) PCT Filed: Jul. 15, 2016

(86) PCT No.: PCT/EP2016/066915
§ 371 (c)(1),
(2) Date: Feb. 8, 2018

(87) PCT Pub. No.: WO2017/036655
PCT Pub. Date: Mar. 9, 2017

(65) Prior Publication Data
US 2018/0231106 A1    Aug. 16, 2018

(30) Foreign Application Priority Data

Aug. 28, 2015    (DE) .................. 10 2015 011 318

(51) Int. Cl.
F16H 7/06    (2006.01)
F16H 7/18    (2006.01)
(Continued)

(52) U.S. Cl.
CPC .............. *F16H 7/06* (2013.01); *F02B 67/06* (2013.01); *F16H 7/08* (2013.01); *F16H 7/18* (2013.01);
(Continued)

(58) Field of Classification Search
CPC ..... F16H 7/06; F16H 7/08; F16H 7/18; F16H 2007/185; F16H 2007/0872;
(Continued)

(56) References Cited

U.S. PATENT DOCUMENTS 4,193,314 A * 3/1980 Horner ...................... F01L 1/02
                                                        123/198 E
5,425,680 A * 6/1995 Young ........................ F01L 1/02
                                                        474/111
(Continued)

FOREIGN PATENT DOCUMENTS

CN    101122320 A    2/2008
CN    201992014 U    9/2011
(Continued)

*Primary Examiner* — Michael R Mansen
*Assistant Examiner* — Raveen J Dias
(74) *Attorney, Agent, or Firm* — BakerHostetler (57) ABSTRACT

A chain drive for an internal combustion engine, comprises a driving sprocket, at least one driven sprocket, a drive chain coupling the sprockets, a pivotably supported tensioning rail which is pressed against one of the spans of the drive chain, and a slide rail which abuts on another of the spans of the drive chain, wherein the slide rail and the tensioning rail have a common base body, which is arranged such that it is pivotable about a common pivot axis, and the arcuate portion of a slide surface of the slide rail, which comes into contact with the drive chain during operation, has an axis of curvature or axes of curvature, and the arcuate portion of a slide surface of the tensioning rail, which comes into contact with the drive chain, has an axis of curvature or axes of curvature.

18 Claims, 6 Drawing Sheets

(51) Int. Cl.
 *F16H 7/08* (2006.01)
 *F16F 15/26* (2006.01)
 *F02B 67/06* (2006.01)

(52) U.S. Cl.
 CPC .... *F16F 15/264* (2013.01); *F16H 2007/0872* (2013.01); *F16H 2007/0874* (2013.01); *F16H 2007/0893* (2013.01); *F16H 2007/0895* (2013.01); *F16H 2007/185* (2013.01)

(58) Field of Classification Search
 CPC ..... F16H 2007/0874; F16H 2007/0893; F16H 2007/0895; F16H 2007/0897; F01L 1/022
 USPC ........................................................ 474/111
 See application file for complete search history.

(56) References Cited

U.S. PATENT DOCUMENTS

| | | | | |
|---|---|---|---|---|
| 5,797,818 | A * | 8/1998 | Young | F16H 7/0838 474/111 |
| 5,951,423 | A * | 9/1999 | Simpson | F01L 1/02 474/109 |
| 5,967,922 | A * | 10/1999 | Ullein | F01L 1/02 474/111 |
| 6,093,123 | A * | 7/2000 | Baddaria | F01L 1/02 474/110 |
| 6,238,311 | B1 * | 5/2001 | Cutting | F16H 7/08 474/109 |
| 6,358,169 | B1 * | 3/2002 | Markley | F02B 67/06 474/111 |
| 6,375,587 | B1 * | 4/2002 | Wigsten | F16H 7/08 474/109 |
| 6,599,209 | B1 * | 7/2003 | Ullein | F16H 7/08 474/111 |
| 2002/0045503 | A1 * | 4/2002 | Young | F16H 7/08 474/111 |
| 2002/0082129 | A1 * | 6/2002 | Bianchi | F16H 7/06 474/84 |
| 2004/0005952 | A1 * | 1/2004 | Bachmair | F16H 7/08 474/111 |
| 2005/0085322 | A1 * | 4/2005 | Markley | F16H 7/08 474/109 |
| 2005/0130776 | A1 * | 6/2005 | Markley | F01L 1/02 474/109 |
| 2006/0243236 | A1 * | 11/2006 | Okamoto | F01L 1/024 123/90.31 |
| 2008/0280710 | A1 * | 11/2008 | Fuhrmann | F16H 7/08 474/109 |
| 2009/0205206 | A1 * | 8/2009 | Markley | F16H 7/08 29/888.01 |
| 2010/0248876 | A1 * | 9/2010 | Kroon | F16H 7/18 474/111 |
| 2011/0201465 | A1 * | 8/2011 | Kim | F16H 7/08 474/111 |
| 2011/0251002 | A1 * | 10/2011 | Mori | F16H 7/06 474/140 |
| 2012/0052997 | A1 * | 3/2012 | Young | F16H 7/08 474/111 |
| 2013/0059686 | A1 * | 3/2013 | Markley | F16H 7/08 474/111 |
| 2014/0162819 | A1 * | 6/2014 | Young | F16H 7/08 474/111 |
| 2015/0345596 | A1 * | 12/2015 | Lindner | F01L 1/022 474/111 |
| 2016/0265632 | A1 * | 9/2016 | Young | F16H 7/08 |
| 2017/0009849 | A1 * | 1/2017 | Stiglmaier | F16H 7/06 |
| 2017/0030452 | A1 * | 2/2017 | Yamauchi | F16H 55/30 |
| 2017/0276216 | A1 * | 9/2017 | Perissinotto | F16H 7/18 |
| 2018/0291987 | A1 * | 10/2018 | Maeda | F16H 7/08 |

FOREIGN PATENT DOCUMENTS

| | | |
|---|---|---|
| CN | 103671779 A | 3/2014 |
| CN | 104029335 A | 9/2014 |
| DE | 10 2004 048 282 A1 | 4/2006 |
| DE | 10 2006 036 735 A1 | 2/2008 |
| DE | 10 2010 005405 A1 | 7/2011 |
| EP | 1 884 683 A2 | 2/2008 |
| WO | 2006/037428 A1 | 4/2006 |
| WO | 2011/146564 A2 | 11/2011 |

\* cited by examiner

CHAIN DRIVE WITH A COMBINATION RAIL

CROSS-REFERENCE TO RELATED APPLICATIONS

This application is a National Stage of International patent application PCT/EP2016/066915, filed on Jul. 15, 2016, which claims priority to foreign German patent application No. DE 10 2015 011 318.6, filed on Aug. 28, 2015, the disclosures of which are incorporated by reference in their entirety.

FIELD OF THE INVENTION

The present invention relates to a chain drive for an internal combustion engine, comprising a driving sprocket, at least one driven sprocket, a drive chain coupling the sprockets, a pivotably supported tensioning rail which is pressed against one of the spans of the drive chain, and a slide rail which abuts on another of the spans of the drive chain, wherein the slide rail and the tensioning rail have a common base body, which is arranged such that it is pivotable about a common pivot axis, and the arcuate portion of a slide surface of the slide rail, which comes into contact with the drive chain during operation, has an axis of curvature or axes of curvature, and the arcuate portion of a slide surface of the tensioning rail, which comes into contact with the drive chain, has an axis of curvature or axes of curvature, and the distance of the axis of curvature which is associated with the slide rail or the averaged distance of the axes of curvature which are associated with the slide rail to the pivot axis of the base body is smaller than the distance of the axis of curvature which is associated with the tensioning rail or the averaged distance of the axes of curvature which are associated with the tensioning rail to the pivot axis of the base body.

BACKGROUND

Such chain drives are widely used for internal combustion engines. One case of use are timing chain drives in the case of which the crankshaft is coupled with the camshafts. The slide rail abuts on the tight span in such drives, whereas the pivotably supported tensioning rail presses against the slack span. The purpose of such an arrangement is e.g. that, on the basis of the structural design of the drive, changes in the rotation angle induced by wear of the chain will be prevented as far as possible. Hence, the tight span should not deviate from its track. The chain stretch caused by wear during the running time of a drive chain is compensated for by the pivotably pressed-on tensioning rail. In addition to the timing chain drive also other chain drives may be provided on the internal combustion engine. Preferably, these other chain drives are an oil pump drive and/or a mass balancer drive. The basic principle of chain tensioning and chain guidance is similar for all these drives. In addition, such chain drives on internal combustion engines are highly dynamic drives which are subjected to high loads, a reliable guidance of the drive chain being absolutely indispensible in this context. In the field of automotive engineering, it is generally aimed at to save costs and to search for solutions which are either more efficient as regards the material used, easier to mount or less complex, whereby costs will also be saved in the production.

A chain drive of the type in question is known e.g. from DE 102004048282 A1. In order to avoid speed changes, the lengths of the tight span and of the slack span are changed by substantially the same amount. This, however, results in limitations as regards the structural design of the chain drive and in particular of the tensioning rail and of the guide rail.

Further chain drives are described in U.S. Pat. No. 6,358,169 A1 and DE 102006036735 A1.

SUMMARY OF THE INVENTION

Hence, it is the object of the present invention to configure a chain drive of the type mentioned at the beginning such that its structural design is more flexible.

According to the present invention, this object is achieved by a chain drive according to claim 1. At first sight, it seems unusual to arrange also the slide rail such that it is pivotable, since it is normally aimed at that any change of the guide track should be avoided as far as possible in the associated span. This structural design offers the possibility of producing a single base body that is a component part of the tensioning rail as well as of the slide rail. In particular in the case of smaller drives, such as the oil pump drive and/or the mass balancer drive, the tensioning rail needs to execute only a limited pivotal movement over the running time of the drive chain, so that also the slide rail will execute a correspondingly small pivotal movement. The influence on the guide track can thus be kept small or may even be zero. The extent of rotation angle change that can be accepted for the driven sprocket involved is here of decisive importance. Replacing a slide rail by a tensioning rail has hitherto been out of the question because it was impossible to connect a chain tensioner to the engine oil hydraulic system. The solution according to the present invention remedies this. The arcuate portion of a slide surface of the slide rail, which comes into contact with the drive chain during operation, has an axis of curvature or axes of curvature, and the arcuate portion of a slide surface of the tensioning rail, which comes into contact with the drive chain during operation, has an axis of curvature or axes of curvature, the distance of the axis of curvature which is associated with the slide rail or the averaged distance of the axes of curvature which are associated with the slide rail to the pivot axis of the base body being smaller than the distance of the axis of curvature which is associated with the tensioning rail or the averaged distance of the axes of curvature which are associated with the tensioning rail to the pivot axis of the base body. This definition assumes, in a simplified manner, that the respective slide surfaces have flat slide surfaces or at least flat guiding components of the slide surfaces in the thickness direction of the base body, so that it can be said that there is an axis of curvature or there are axes of curvature which extends or extend naturally parallel to the pivot axis. The arcuate shape of the slide surface need not necessarily be a circular arc shape, and, consequently, various axes of curvature may be obtained along the length of the slide surface. In practice, circular arc sections are normally placed side by side. For reasons of simplification, an averaged distance of all these curvature axes is then calculated by dividing the sum of the distances of the curvature axes to the pivot axis by the number of curvature axes. As regards this observation, it is also important that only the slide surface sections which actually come into contact with the drive chain during operation are taken into account in this observation. A slide surface may naturally be provided with a great variety of profiles, recesses, interruptions, etc., e.g. for reducing the friction, which are of no importance in this observation. The distance of the axis of curvature which is associated with the slide rail or the averaged distance of axes of curvature which are associated with the slide rail to the pivot axis of the base body is smaller than 6 times, preferably smaller than 4.5 times, the chain pitch of the drive chain. The optimum is, of course, when this distance to the slide surface is zero, i.e. when the axis of curvature is identical with the pivot axis, since the guide track will then no longer change at all. In the case of small rotation angles and small distances of the slide surface of the slide rail to the pivot axis, a distance may, however, be accepted, since the resultant influence is comparatively small. In particular when this distance is smaller than the limit value that has here been chosen, the resultant influence will be very small.

Chain drives may comprise a plurality of sprockets. Normally, only a single sprocket is a driving sprocket. In an internal combustion engine this is normally a crankshaft sprocket. For the present observation, only the sub-strand of the drive chain extending between the driving sprocket and the last driven sprocket is considered to be the slack span. All the other sections of the drive chain, i.e. from one driven sprocket to a next driven sprocket or from one driving sprocket to the first driven sprocket, are referred to as tight span.

It follows that the advantages of the present invention can be illustrated in a particularly clear manner, when the tensioning rail is pressed against a tight span of the drive chain and when the slide rail abuts on a slack span of the drive chain.

The use of a common base body leads to a saving of costs through an elimination of tool costs, to a reduction of complexity through a reduction of the number of parts and to a reduction of effort and material in mounting (two screws, which are normally used for fastening the slide rail, are no longer necessary).

The distances between the sprockets of a chain drive may be different. Hence, a variant is advantageously so conceived that the common base body comprises a long support section associated with the tensioning rail and a shorter support section associated with the slide rail. Since the slide rail is shorter, a measure has already been taken, which reduces the influence that the pivoting of this slide rail has on the guide track of the drive chain.

The here defined measure has the effect that a pivotal movement of the base body will have much less influence on the slide rail than on the tensioning rail, so that the chain stretch will primarily be compensated for by the tensioning rail. The influence on the guide track of the slide rail remains small.

According to a further preferred embodiment, the arcuate shape of the slide rail and the distance may be chosen such that a change of the effective length of the associated slack span taking place during operation is a maximum change of 0.3 times the chain pitch, preferably of 0.16 times the chain pitch. The stretch of the drive chain to be taken into account here, relates to the new condition of the chain and the maximum admissible stretch specified by the manufacturer and caused by wear during operation. Only a fractional amount of this stretch is therefore compensated for by the slack span. The main compensation still takes place by means of the tensioning rail.

Preferably, two driven chains wheels may be provided, which are positioned such that, between the two driven sprockets, the tight span of the drive chain is deflected by more than 85°, preferably by more than 90°, by means of the tensioning rail, the support section of the base body associated with the tensioning rail extending (at least sectionwise) in an arcuate shape around the driving sprocket in spaced relationship therewith. Thus, the tensioning rail substantially contributes to the routing of the drive chain, without it being necessary to add a further intermediate sprocket. The deflection by more than 85° provides advantageous spatial conditions, which allow a very compact drive. In addition, the tight span between the two driven sprockets can be routed such that it moves past the driving sprocket at a comparatively small distance therefrom.

In addition, a chain tensioner, which presses against the free end portion of the support section associated with the tensioning rail, may be arranged in the area of the tight span between the driving sprocket and the driven sprocket that is most remote from the common pivot axis of the base body. To this end, the chain tensioner is normally arranged within the area delimited by the drive chain, whereby the chain drive remains slender.

In addition, a further slide rail may be provided as an integral component of the chain tensioner, said slide rail abutting on the tight span between the driving sprocket and the driven sprocket that is most remote from the common pivot axis of the base body. Hence, also this segment is guided and its guide track will therefore not undergo any changes.

According to a further embodiment, the driving sprocket is configured to drive a crankshaft, the driven sprocket which is located closest to the common pivot axis is configured to drive the shaft of an oil pump, and the other driven sprocket is configured to drive the shaft of a mass balancer. The advantages have here a particularly noticeable effect, since minor changes of the rotation angle, which will occur nevertheless, can be put up with. Moreover, such a chain drive is very compact and can be produced with a small number of components, whereby it will become less expensive and easier to mount.

Furthermore, the present invention relates to a combination rail for a chain drive according to one of the claims 1 to 8. This combination rail comprises a common base body, a first, long slide section to be associated with a tensioning rail, and a second, short slide section to be associated with a slide rail, wherein the base body defines a common pivot axis for the slide sections, the first slide section is configured such that it is adapted to be brought into contact with a first span, preferably a tight span of the chain drive, and the second slide section is configured such that it is adapted to be brought into contact with a second span, preferably the slack span of the chain drive. In order to restrain the influence of the slide rail on the routing of the guide track as far as possible, the slide section to be associated with the slide rail is arranged in the area of the pivot axis, the arcuate slide section, which is adapted to be brought into contact with the drive chain during operation, having a curvature axis or curvature axes whose distance to the pivot axis or whose averaged distance to the pivot axis is smaller than 6 times, preferably smaller than 4.5 times, the chain pitch of a drive chain of the chain drive. Due to the small distance also the resultant influence on the routing of the guide track will be small. This is additionally supported by the circumstance that the pivot axis is arranged comparatively close to the slide section.

Preferably, the base body together with the slide sections may be produced integrally as a single-component part. This makes the combination rail even less expensive, since the use of different plastic materials is dispensed with. In addition, a subdivision between the support body and the sliding lining bodies is dispensed with, such sliding lining bodies being frequently used in such drives. Alternatively, a two-component design may, of course, be realized.

Furthermore, it will be of advantage when, according to an embodiment, the slide section to be associated with the tensioning rail is configured in an arcuate shape such that the drive chain of the chain drive is deflectable by more than 85°, preferably by more than 90°, between two driven sprockets of the chain drive. The tensioning rail is therefore strongly curved and tensions not only the drive chain but contributes also substantially to the routing of the drive chain. The combination rail represents in this context a very cost-efficient and simple means for such a measure.

In order to keep the influence of the slide rail as small as possible and to compensate a change in the length of the drive chain substantially by the tensioning rail, the slide section to be associated with the slide rail may comprise an effective slide surface having a length that is 5 times, preferably 6 times, shorter than the length of the effective slide surface of the slide section to be associated with the tensioning rail.

BRIEF DESCRIPTION OF THE DRAWINGS

In the following, an embodiment of the present invention will now be explained in more detail making reference to the drawings, in which.

DETAILED DESCRIPTION

Figure 1:
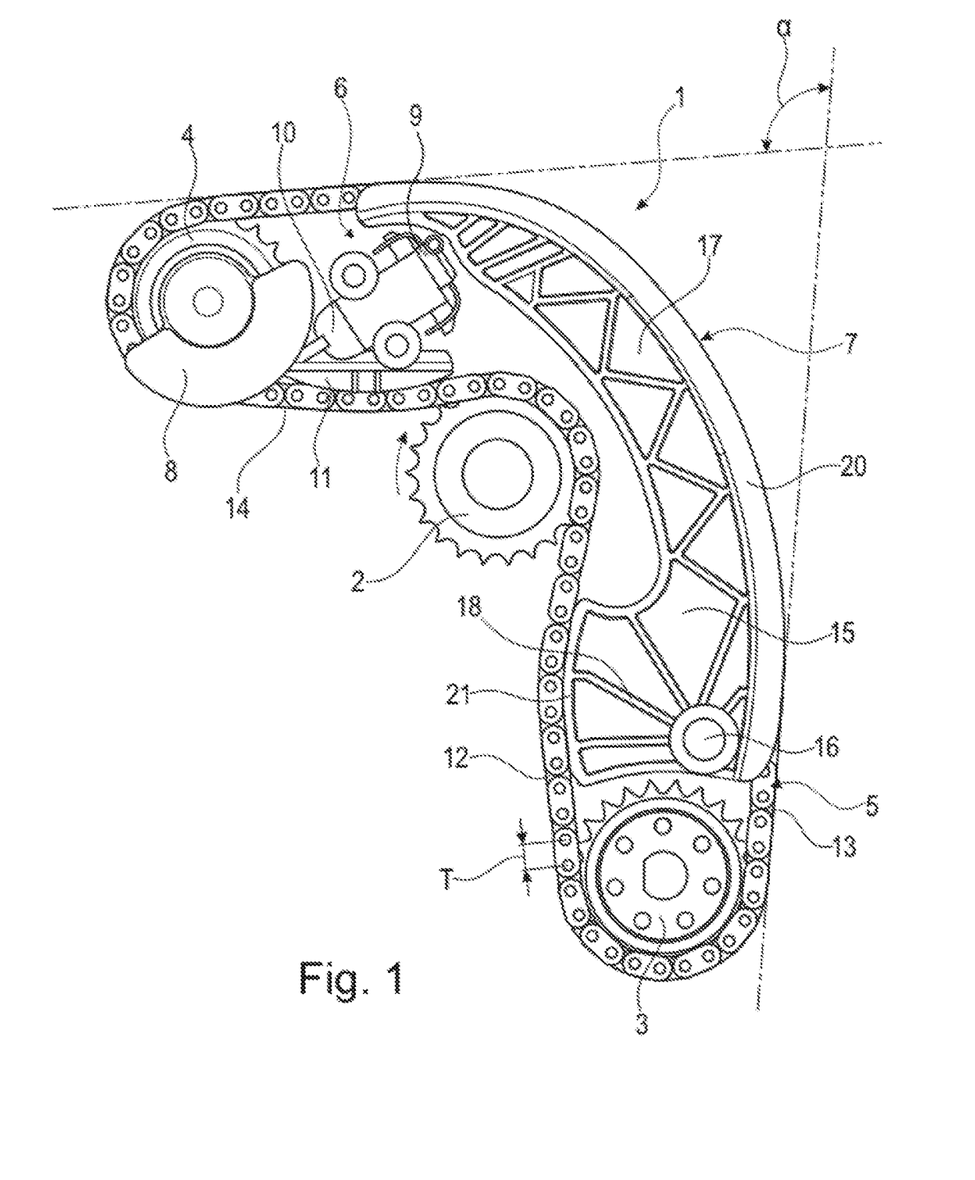
FIG. 1 shows a front view of a chain drive according to the present invention.

The chain drive 1 shown in FIG. 1 is shown without the internal combustion engine and without the associated fasteners for the sake of simplicity. This chain drive is an oil pump drive and a mass balancer drive for such an internal combustion engine.

The chain drive 1 substantially comprises a driving crankshaft sprocket 2, an oil pump sprocket 3, a mass balancing sprocket 4, a drive chain 5 coupling the sprockets 2, 3, 4 to one another, a chain tensioner 6 and a combination rail 7. The crankshaft sprocket 2 is connected to the crankshaft of the internal combustion engine, which is not shown, and is in mesh with the outer side of the drive chain 5. When the internal combustion engine is in operation, the crankshaft sprocket 2 rotates clockwise and is in mesh with the inner side of the drive chain. In the normal mounting condition of the internal combustion engine, the oil pump sprocket 3 is arranged below the crankshaft sprocket 2 and within an area delimited by the drive chain 5. Other than the crankshaft sprocket 2, around which the drive chain 5 is wrapped over an angle that is slightly larger than 90°, the oil pump sprocket 3 has wrapped the drive chain 5 therearound over an angle of almost 180°. The mass balancing sprocket 4 drives a mass balancing weight 8, which has a vibration-reducing effect and which counteracts in the manner known the unbalances induced by the crankshaft. The drive chain 5 is also wrapped around the mass balancing sprocket 4 over an angle of almost 180°. The chain tensioner 6 is arranged within an area delimited by the drive chain 5. In the drawing, it is shown in its locked position. As soon as it has been unlocked, its tensioning piston 9 presses against the combination rail 7. The chain tensioner housing 10 is secured to the engine block by fasteners that are not shown. The lower end of the chain tensioner housing 10 has mounted thereon a slide rail 11, which defines a unit together with the chain tensioner 6 and which abuts on the inner side of the drive chain 5 between the crankshaft sprocket 2 and the mass balancing sprocket 4.

The drive chain 5 shown is a roller chain with alternate inner and outer chain links having a conventional structural design and a pitch T. Alternatively, also a bush chain may be used. In addition to the sections of the drive chain 5 which are fully (without entering and exiting sections) in mesh with the sprockets 2, 3, 4, three sub-strands are obtained. These sub-strands are the slack span 12 extending between the crankshaft sprocket 2 and the oil pump sprocket 3, the comparatively long tight span 13 extending between the oil pump sprocket 3 and the mass balancing sprocket 4 and the comparatively short tight span 14 extending between the mass balancing sprocket 4 and the crankshaft sprocket 2.

Figure 2:
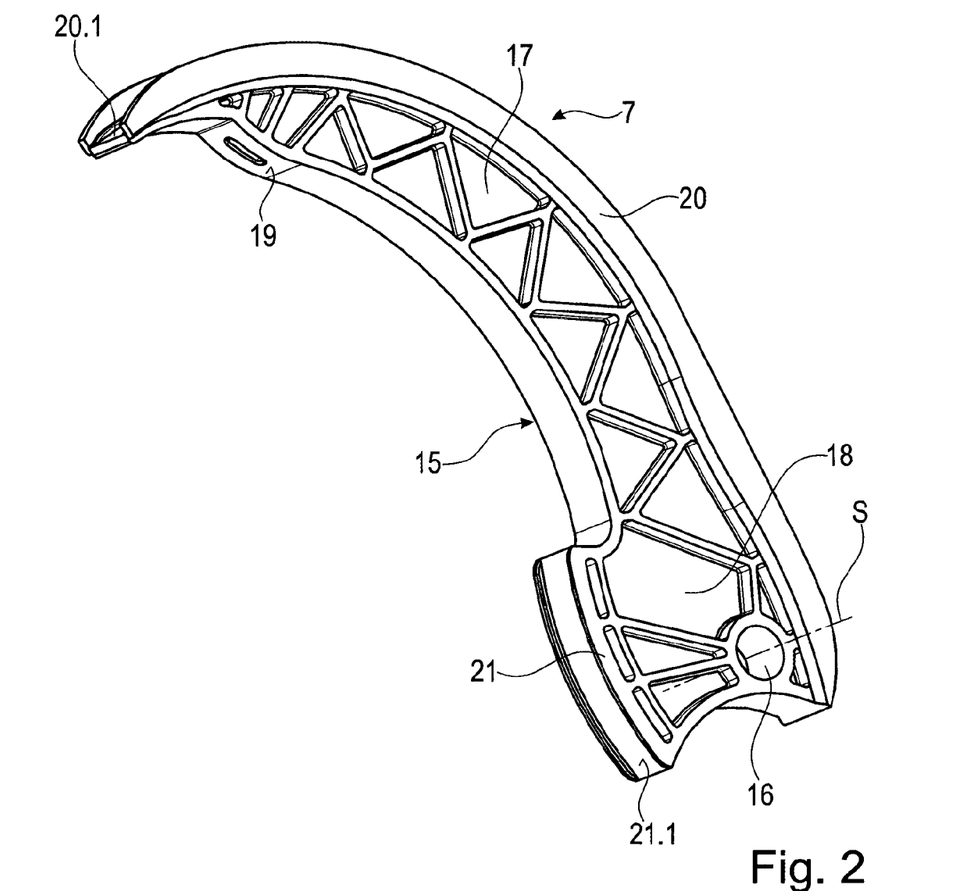
FIG. 2 shows a perspective front view of the combination rail according to FIG. 1.
Figure 3:
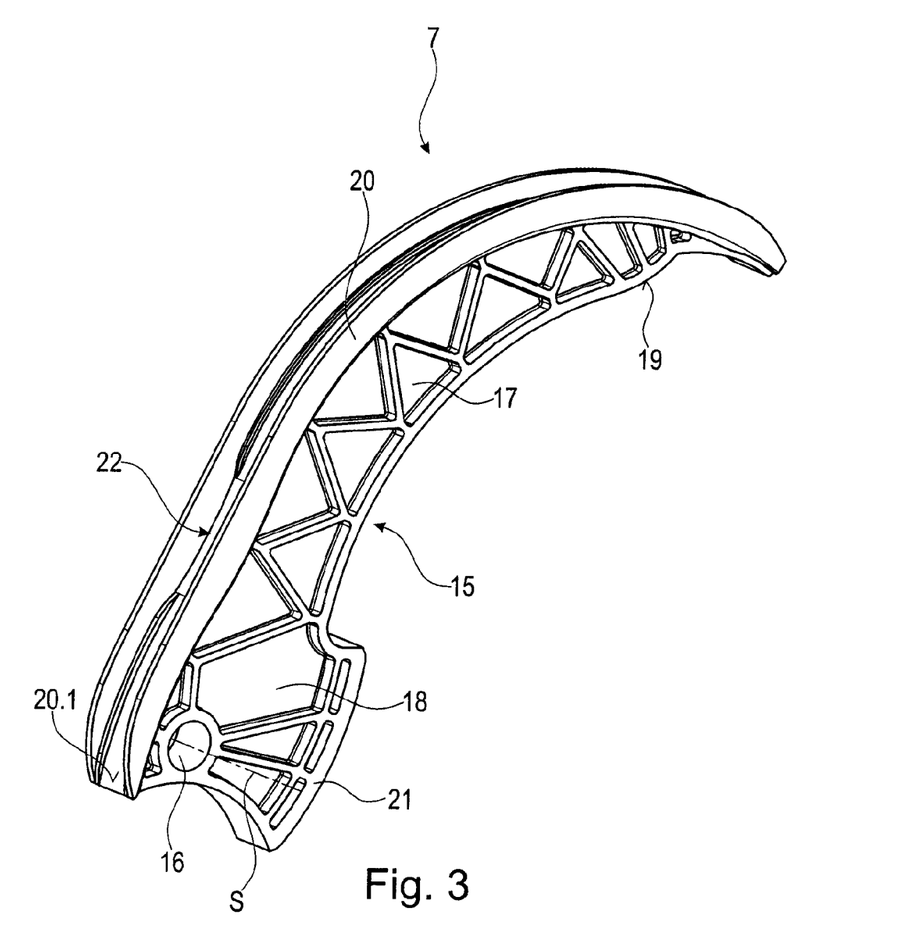
FIG. 3 shows a perspective rear view of the combination rail according to FIG. 1.

In the following, the combination rail 7 will now be explained in more detail with the aid of FIGS. 2 and 3.

Figure 4A:
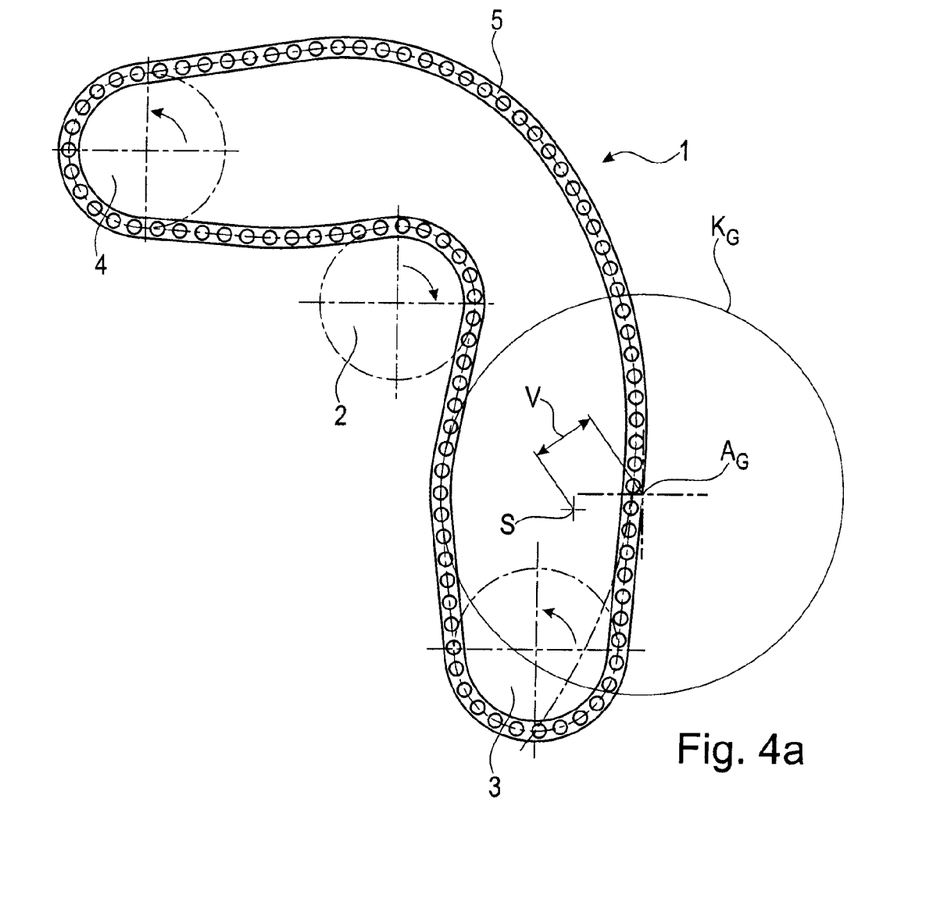
FIG. 4a shows a perspective view of the chain drive for illustrating the principle of the embodiment shown in FIG. 1.

The combination rail 7 is arranged within an area delimited by the drive chain 5 and comprises a common base body 15 provided with a pivoting eye 16 on the lower end thereof, said pivoting eye 16 being used for receiving therein a pivot pin connected to the engine block. The main axis of the pivoting eye 16 is to be equated with the pivot axis S of the combination rail 7. The base body 15 is subdivided into a longer support section 17 of arcuate shape and a short support section 18. The combination rail 7 is a combination of a pivotably arranged tensioning rail, which is mainly defined by the longer support section 17, and a slide rail, which is mainly defined by the shorter support section 18. The shorter support section 18 is located in the area of the pivoting eye 16, whereas the long support section 17 mainly extends away from this pivoting eye 16. The base body 15 is provided with a truss structure. On the back of the base body 15, at the end located remote from the pivoting eye 16, there is a press-on area 19 onto which the end face of the tensioning piston 9 of the chain tensioner 6 presses during operation. The base body 15 is configured integrally and represents a single-component part. This means that the press-on sides of the respective support sections 17, 18 are provided with a long slide section 20 and a short slide section 21. The respective slide sections 20 and 21 define an arcuate slide surface 20.1 and a slide surface 21.1, which are directed away from one another and which each abut on the inner side of the drive chain. The slide surface 21.1 to be associated with the slide rail is configured straight and flat, respectively, in the thickness direction of the combination rail 7 and has, at least in the section which enters into contact with the drive chain during operation, a circular curvature with a radius of curvature R in a simplified manner. Due to the straight and flat shape of the slide surface 21.1, also a curvature axis $A_G$ can be taken into account for observation. This curvature axis $A_G$ is shown in FIG. 4a, so is the circle of curvature $K_G$ associated therewith. The curvature axis $A_G$ extends perpendicular to the image plane and the circle of curvature $K_G$ characterizes the circular curvature of the slide surface 21.1. This observation does not take into account the radii of the roundings at the ends of the slide section 21, since these roundings are not intended to enter into contact with the drive chain 5.

Figure 4B:
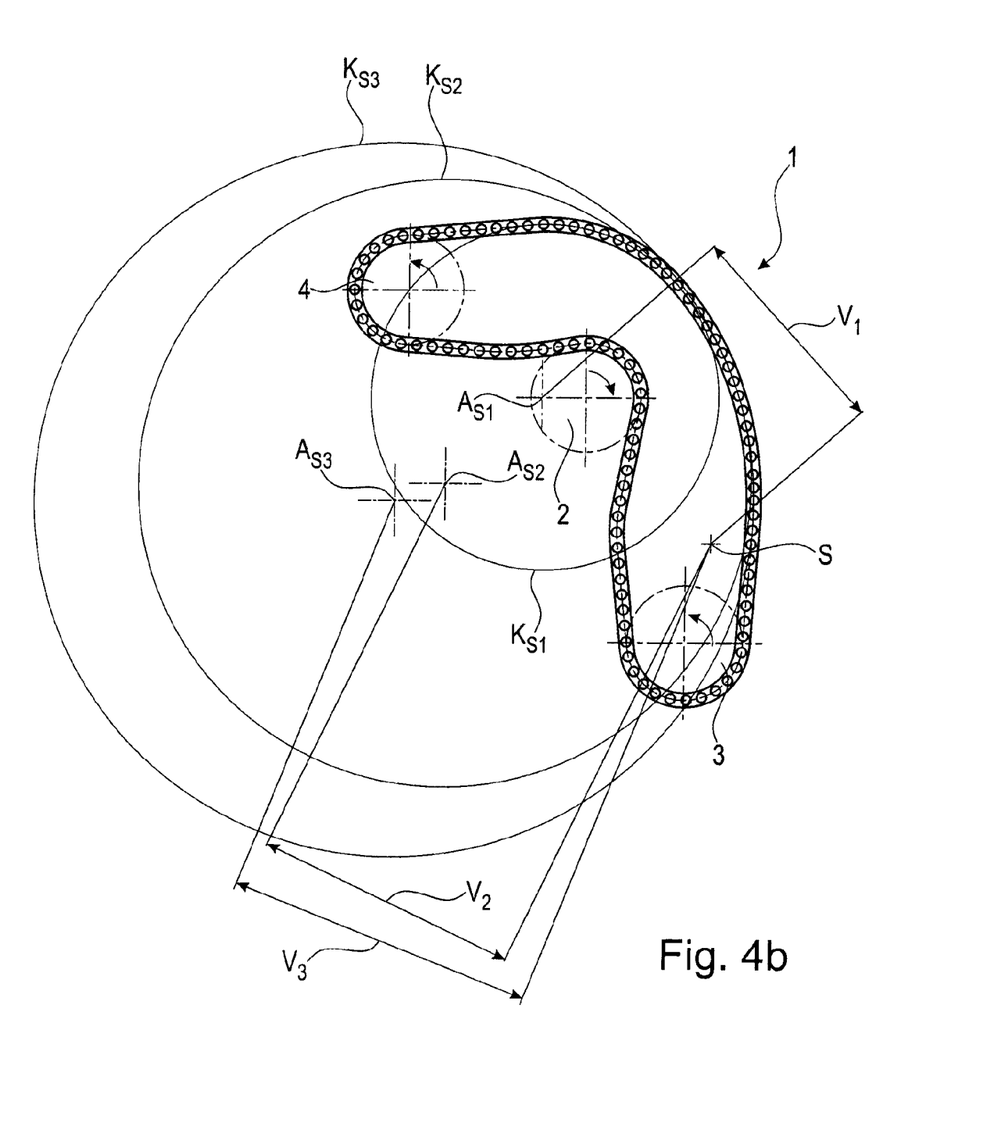
FIG. 4b shows a perspective view of the chain drive for illustrating the principle of the embodiment shown in FIG. 1

The slide section 20 comprises a subdivided slide surface 20.1. In this area 22 no contact with the drive chain 5 occurs. This has friction-reducing reasons. The remaining sections of the slide surface 20.1 have three different curvatures, and, consequently, different circles of curvature $K_{S1}$, $K_{S2}$, $K_{S3}$ and curvature axes $A_{S1}$, $A_{S2}$, $A_{S3}$ are here to be determined (cf. also FIG. 4b). Also in this case, radii of the roundings at the ends of the slide section 20 as well as the recessed roundings in the area 22 are of no importance for the observation. In order to actually allow tensioning of the drive chain 5 by means of the combination rail 7, so as to compensate for a stretch of the drive chain 5 during operation, the pivot axis S (cf. FIG. 5) is arranged in displaced relationship with the curvature axes $A_{S1}$, $A_{S2}$, $A_{S3}$ of the slide surface 20.1. For simplified observation, a respective distance $V_1$, $V_2$, $V_3$ from the pivot axis S to the curvature axes $A_{S1}$, $A_{S2}$, $A_{S3}$ of the slide surface 20.1 is determined and divided by the number (here 3) of the distances $V_1$, $V_2$, $V_3$ or curvature axes $A_{S1}$, $A_{S2}$, $A_{S3}$ to be taken into account in the present context, so as to obtain an averaged distance.

The distance V of the pivot axis S from the curvature axis $A_G$ is shown in FIG. 4. The distance V is chosen such that, in the present case, it is smaller than 3 times the chain pitch T (according to definition smaller than 6 times, preferably smaller than 4.5 times the chain pitch T). In addition, the distance of the pivot axis S to the slide surface 21.1 is smaller than the radius of curvature R of the circle of curvature $K_G$. If the combination rail 7 is now pivoted clockwise due to stretching of the drive chain 5 during operation, this will, of course, also influence the routing of the slack span 12. The slide section 21 is pivoted slightly away from the drive chain 5. The influence is, however, comparatively small due to the geometrical conditions chosen. In the present case, the effective length of the slack span 12 changes only very slightly during operation, viz. less than 0.16 times the chain pitch T (according to definition not more than 0.3 times the chain pitch T, preferably not more than 0.16 times the chain pitch T), the influence on the angle of rotation being thus only small. What changes predominantly is the length of the tight span 13 because the averaged distance of the curvature axes to the pivot axis S, related to the slide surface 20.1, is much larger. Moreover, the effective slide surface (i.e. the length from the area where the chain enters up to the area where the chain exits the slide surfaces 20.1 and 21.1, respectively) is more than 5 times longer in the case of the slide surface 20.1 than the effective length of the slide surface 21.1 (according to definition 5 times longer, preferably 6 times longer). Therefore, the length compensation is mainly caused by the slide section 20.

Furthermore, it should be stated that the slide section 20 is configured in an arcuate shape such that the drive chain 5 is deflected between the exit end on the mass balancing sprocket 4 and the meshing end on the oil pump sprocket 3 by an angle α of more than 90° (according to definition more than 80°, preferably more than 90°). Due to this fact and due to the fact that the base body 15 does not have its full height over the main part of its length, said full height existing in the area of the slide section 21, the resultant chain drive 1 is, on the whole, narrow and requires little space. Due to the arrangement of the combination rail 7, the resulting from the slight pivotal displacement of the support section 18 representing the slide rail can be more than compensated for. The combination rail 7 is easy to produce because it only necessitates the use of a single tool. Fastening is reduced to a single swivel mounting by means of the pivoting eye 16. An additional fastening of the slide rail can be dispensed with. This leads to distinct cost advantages and to simplified mounting.

Figure 5:
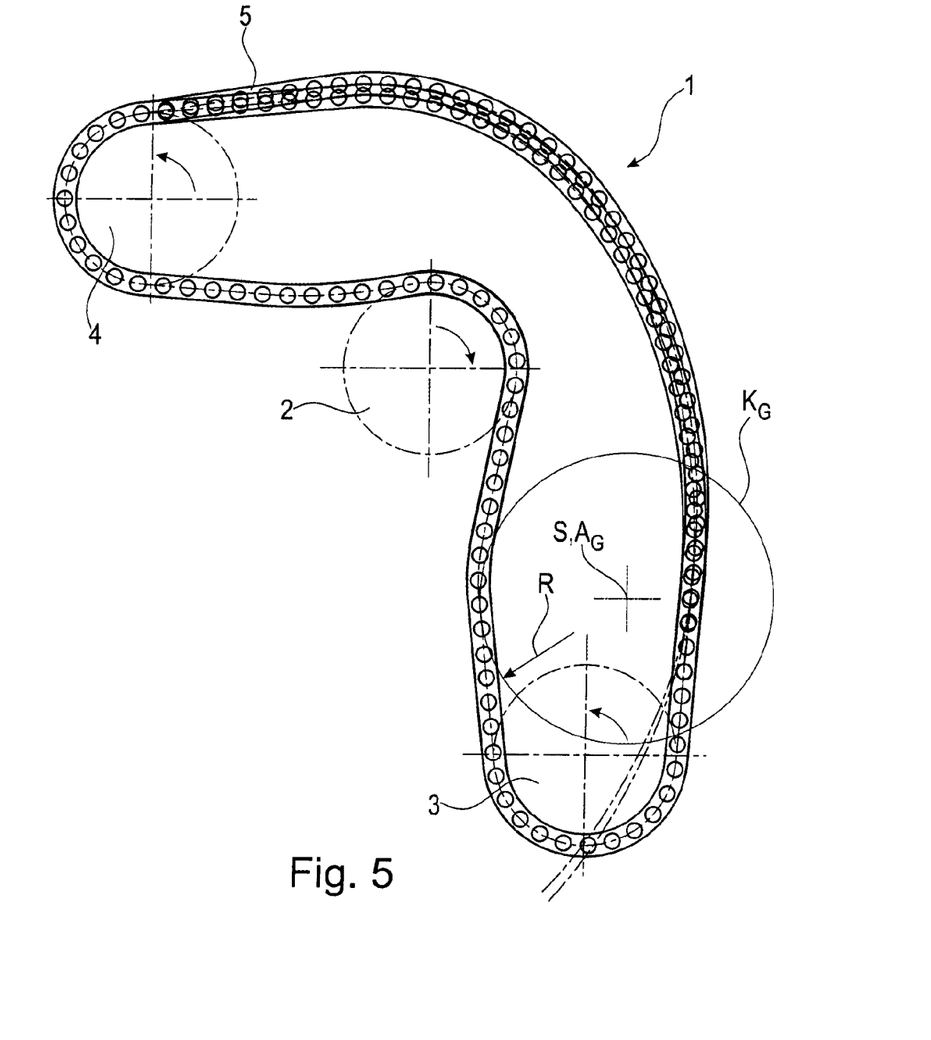
FIG. 5 shows a schematic sketch of the chain drive for illustrating the ideal case.

Making reference to FIG. 5, the aimed-at ideal case, which, however, can only be used when admissible installation space conditions are given, will now additionally be discussed. In this ideal case, the pivot axis S and the curvature axis $A_G$ of the slide rail are congruent. Hence, a correspondingly smaller circle of curvature $K_G$ will be used. If the combination rail 7 now pivots about the pivot axis S, this will no longer have any influence whatsoever on the guide track of the slack span 12. Only the slide surface 21.1 will be slightly displaced, but this does not have any effect on the guide track. The complete pivoting distance is then provided by the slide section 20. The two routings of the drive chain 5, in the new condition as well as after chain stretch, are shown in FIG. 5. It can also be seen that there will be no change in the tight span 14. In practice, a compromise, similar to FIG. 5, will, however, have to be made, and this means that a slight change in the routing of the slack span 12 will have to be accepted.

LIST OF REFERENCE NUMERALS 1 chain drive
2 crankshaft sprocket
3 oil pump sprocket
4 mass balancing sprocket
5 drive chain
6 chain tensioner
7 combination rail
8 mass balancing weight
9 tensioning piston
10 chain tensioner housing
11 slide rail
12 slack span
13 long tight span
14 short tight span
15 base body
16 pivoting eye
17 short support section
18 long support section
19 press-on area
20 slide section
21 slide section
20.1 slide surface
21.1 slide surface
22 area
$A_G$ curvature axis
$A_{S1}$, $A_{S2}$, $A_{S3}$ curvature axis
$K_G$ circle of curvature
$K_{S1}$, $K_{S2}$, $K_{S3}$ circle of curvature
R radius of curvature
S pivot axis
T chain pitch
V distance
$V_1$, $V_2$, $V_3$ distance
α angle

The invention claimed is:

1. A chain drive for an internal combustion engine, comprising a driving sprocket, at least one driven sprocket, a drive chain coupling the sprockets, a pivotably supported tensioning rail which is pressed against one of the spans of the drive chain, and a slide rail which abuts on another of the spans of the drive chain, wherein the slide rail and the tensioning rail have a common base body, which is arranged such that it is pivotable about a common pivot axis, and an arcuate portion of a slide surface of the slide rail, which comes into contact with the drive chain during operation, has an axis of curvature or axes of curvature, and an arcuate portion of a slide surface of the tensioning rail, which comes into contact with the drive chain, has an axis of curvature or axes of curvature, and the distance of the axis of curvature which is associated with the slide rail or the averaged distance of the axes of curvature which are associated with the slide rail to the pivot axis of the base body is smaller than a distance of the axis of curvature which is associated with the tensioning rail or an averaged distance of the axes of curvature which are associated with the tensioning rail to the common pivot axis of the common base body, wherein a distance of the axis of curvature which is associated with the slide rail or an averaged distance of the axes of curvature which are associated with the slide rail to the common pivot axis of the common base body is smaller than 6 times a chain pitch of the drive chain.

2. The chain drive according to claim 1, wherein the tensioning rail is pressed against a tight span of the drive chain and wherein the slide rail abuts on a slack span of the drive chain.

3. The chain drive according to claim 1, wherein the common base body comprises a long support section associated with the tensioning rail and a shorter support section associated with the slide rail.

4. The chain drive according to claim 1, wherein the arcuate shape of the slide rail and the distance of the axis of curvature which is associated with the slide rail or the averaged distance of the axes of curvature which are associated with the slide rail are chosen such that a change of the effective length of a slack span taking place during operation is a maximum change of 0.3 times the chain pitch.

5. The chain drive according to claim 1, wherein two driven sprockets are provided, which are positioned such that, between the two driven sprockets, a tight span of the drive chain is deflected by more than 80° by means of the tensioning rail, the support section of a common base body associated with the tensioning rail extending in an arcuate shape around the driving sprocket in spaced relationship therewith.

6. The chain drive according to claim 5, wherein in an area of the tight span between the driving sprocket and a driven sprocket of the two driven sprockets that is most remote from the common pivot axis of the common base body, a chain tensioner is arranged, which presses against a free end portion of the support section associated with the tensioning rail.

7. The chain drive according to claim 6, wherein a further slide rail is provided as an integral component of the chain tensioner, said slide rail abutting on the tight span between the driving sprocket and the driven sprocket that is most remote from the common pivot axis of the common base body.

8. The chain drive according to claim 5, wherein the driving sprocket is configured to drive a crankshaft, the driven sprocket of the two driven sprockets that is located closest to the common pivot axis is configured to drive a shaft of an oil pump, and the other driven sprocket is configured to drive a shaft of a mass balancer.

9. The chain drive according to claim 1, wherein the distance of the axis of curvature which is associated with the slide rail or the averaged distance of the axes of curvature which are associated with the slide rail to the common pivot axis of the common base body is smaller than 4.5 times the chain pitch of the drive chain.

10. The chain drive according to claim 1, wherein the arcuate shape of the slide rail and the distance of the axis of curvature which is associated with the slide rail or the averaged distance of the axes of curvature which are associated with the slide rail are chosen such that a change of the effective length of a slack span taking place during operation is a maximum change of 0.16 times the chain pitch.

11. The chain drive according to claim 1, wherein two driven sprockets are provided, which are positioned such that, between the two driven sprockets, a tight span of the drive chain is deflected by more than 90° by means of the tensioning rail, a support section of the common base body associated with the tensioning rail extending in an arcuate shape around the driving sprocket in spaced relationship therewith.

12. A combination rail for a chain drive, comprising a common base body, a first, long slide section to be associated with a tensioning rail, and a second, short slide section to be associated with a slide rail, wherein the common base body defines a common pivot axis for the slide sections, the first long slide section is configured such that it is adapted to be brought into contact with a tight span of the chain drive, and the second short slide section is configured such that it is adapted to be brought into contact with a slack span of the chain drive, wherein the second short slide section to be associated with the slide rail is arranged in the area of the common pivot axis, the second short slide section, which is adapted to be brought into contact with a drive chain during operation, having a curvature axis or curvature axes whose distance to the common pivot axis or whose averaged distance to the pivot axis is smaller than 6 times the chain pitch of the drive chain of the chain drive.

13. The combination rail according to claim 12, wherein the common base body together with the slide sections is produced integrally as a single-component part.

14. The combination rail according to claim 12, wherein the first long slide section to be associated with the tensioning rail is configured in an arcuate shape such that the drive chain of the chain drive is deflectable by more than 80° between two driven sprockets of the chain drive.

15. The combination rail according to claim 12, wherein the second short slide section to be associated with the slide rail comprises an effective slide surface having a length that is 5 times shorter than a length of the effective slide surface of the first long slide section to be associated with the tensioning rail.

16. The combination rail according to claim 12, wherein the first long slide section to be associated with the tensioning rail is configured in an arcuate shape such that the drive chain of the chain drive is deflectable by more than 90° between two driven sprockets of the chain drive.

17. The combination rail according to claim 12, wherein the second short slide section to be associated with the slide rail comprises an effective slide surface having a length that is 6 times shorter than a length of the effective slide surface of the first long slide section to be associated with the tensioning rail.

18. A combination rail for a chain drive, comprising a common base body, a first, long slide section to be associated with a tensioning rail, and a second, short slide section to be associated with a slide rail, wherein the common base body defines a common pivot axis for the slide sections, the first long slide section is configured such that it is adapted to be brought into contact with a tight span of the chain drive, and the second short slide section is configured such that it is adapted to be brought into contact with a slack span of the chain drive, wherein the second short slide section to be associated with the slide rail is arranged in the area of the common pivot axis, the second short slide section, which is adapted to be brought into contact with a drive chain during operation, having a curvature axis or curvature axes whose distance to the common pivot axis or whose averaged distance to the pivot axis is smaller than 4.5 times the chain pitch of the drive chain of the chain drive.

* * * * *

UNITED STATES PATENT AND TRADEMARK OFFICE
CERTIFICATE OF CORRECTION

PATENT NO. : 10,876,603 B2
APPLICATION NO. : 15/751446
DATED : December 29, 2020
INVENTOR(S) : Franz Stiglmaier Page 1 of 1

It is certified that error appears in the above-identified patent and that said Letters Patent is hereby corrected as shown below:

In the Claims

In Claim 5, Column 9, Line 39, "the support section of a common base body" should be -- a support section of the common base body --.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*